D. P. PATTERSON.
Mashing Apparatus.
No. 29,713.
Patented Aug. 21, 1860.
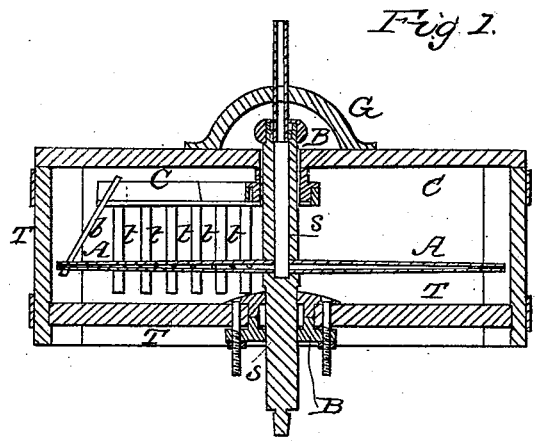
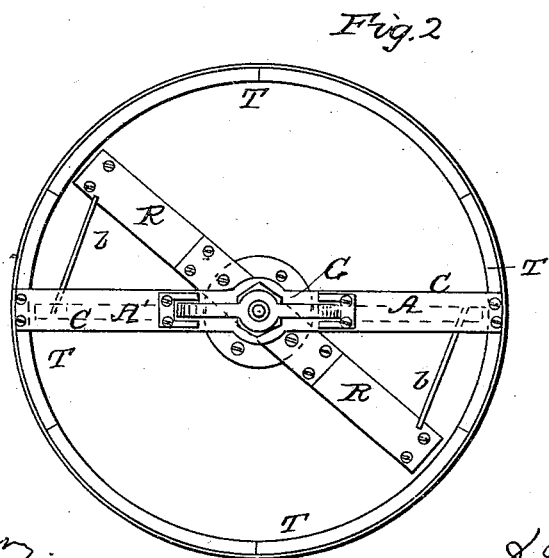

UNITED STATES PATENT OFFICE.

DAVID P. PATTERSON, OF FAYETTE COUNTY, PENNSYLVANIA.

CONSTRUCTION OF DISTILLERS' MASH-TUBS.

Specification of Letters Patent No. 29,713, dated August 21, 1860.

*To all whom it may concern:*

Be it known that I, DAVID P. PATTERSON, of Fayette county, in the State of Pennsylvania, have invented a new and useful Improvement in the Mashing Apparatus used in Distilling; and I do hereby declare the following to be a correct description of the same, reference being had to the accompanying drawings, in which—

Figure 1, is a vertical central section of a mash tub with my improvements attached and Fig. 2 is a top view or plan of the same.

The nature of my invention consists in combining with the ordinary rakes used to stir the mash, two or more hollow perforated steam arms which revolve in the tub and, receiving steam from a suitable boiler, diffuse it through the mash in so uniform a manner as to keep the mash at an even temperature during the whole operation, thus greatly facilitating the process of distilling, and increasing the yield of spirits from the grain.

The same part is marked in both figures by the same letter of reference.

T marks the mash tub of the usual form; across the top of this tub is placed a cross piece C which supports the central shaft S. This shaft is made hollow for a portion of its length as shown, and near the bottom of the hollow portion $s$, it receives two or more hollow perforated arms A A'. At the top of the shaft S, enters a steam pipe P, through a stuffing box B, which allows freedom of motion and prevents escape of steam. This pipe passes through, and is supported by an arch G.

R marks the back and $t\ t,\ t$ &c., the teeth of the stirring rake, which may have as many arms as may be deemed necessary. From the back of the rake pass braces $b,\ b,$ which support the outer ends of the steam arms A A'. The perforations in these arms are placed in the rear side so that as the arms move around there will be no tendency in the holes to become clogged.

The operation is as follows: Motion being communicated in any suitable manner to the shaft S, the rake teeth $t$ are carried around in the tub, and stir the mash it contains. At the same time, steam enters, through pipe P and the hollow $s$ of shaft S, the arms A A', and passes out of the perforations of those arms, being thus intimately and uniformly diffused throughout the mash and keeping it at an even temperature as long as may be required.

I am aware that steam has before been introduced into the mash, by means of hollow rake teeth through which the steam passed and was emitted into the mash either through the open lower extremities of the teeth or through apertures in their sides. These devices allow of the escape of much of the steam from the furrows in the mash made by the rake teeth, without passing through the mash. They also heat the teeth so that much meal is caked and wasted around them and the operation clogged and impeded. Such devices differ totally in practical effect from mine and I distinctly disclaim them.

Having fully described my invention what I claim and desire to secure by Letters Patent is—

The combination with the stirring rake of a mash tub of the perforated steam arms A A' constructed arranged and operating substantially in the manner described.

The above specification, signed and witnessed this twenty ninth day of June, A. D. 1860.

D. P. PATTERSON.

Witnesses:
CHAS. F. STANSBURY,
EDW. F. BROWN.